US012280944B2

(12) United States Patent
Forand

(10) Patent No.: US 12,280,944 B2
(45) Date of Patent: Apr. 22, 2025

(54) GRAVITY LOCK AND BIN INCLUDING THE SAME

(71) Applicant: Daniel Forand, Noyan (CA)

(72) Inventor: Daniel Forand, Noyan (CA)

( * ) Notice: Subject to any disclaimer, the term of this patent is extended or adjusted under 35 U.S.C. 154(b) by 139 days.

(21) Appl. No.: 18/071,027

(22) Filed: Nov. 29, 2022

(65) Prior Publication Data

US 2023/0365329 A1 Nov. 16, 2023

(30) Foreign Application Priority Data

May 13, 2022 (GB) ..................................... 2207072

(51) Int. Cl.
*B65D 55/10* (2006.01)
*B65F 1/16* (2006.01)
*E05B 15/00* (2006.01)

(52) U.S. Cl.
CPC .......... *B65F 1/1615* (2013.01); *B65F 1/1646* (2013.01); *E05B 15/0093* (2013.01)

(58) Field of Classification Search
CPC ................. B65F 1/1615; B65F 1/1646; B65F 2210/148; E05B 15/0093; E05B 65/5292; B65D 55/10; E05C 1/00
USPC .................. 220/315; 292/130, 230, 127, 197
See application file for complete search history.

(56) References Cited

U.S. PATENT DOCUMENTS 4,155,584 A 5/1979 Pracchia
5,094,487 A * 3/1992 Drewry ............... E05B 15/0093 292/135
5,415,314 A 5/1995 McCollum
5,772,061 A 6/1998 Lowe
5,772,264 A 6/1998 Bettenhausen
6,290,093 B1 * 9/2001 Obriot ................. E05B 15/0093 220/908
6,666,485 B1 12/2003 Moret
7,597,365 B2 10/2009 Kreitzer
8,550,282 B1 10/2013 Libhart
9,260,891 B2 2/2016 Treadwell
9,376,255 B2 6/2016 Banik et al.
9,718,615 B2 8/2017 Raghunathan et al.
9,738,445 B2 8/2017 Foster
9,821,957 B1 11/2017 Hurst
9,856,058 B1 1/2018 Arthurs et al.
9,963,276 B1 5/2018 Arthurs et al.
10,046,911 B2 8/2018 Reeb et al.
10,208,512 B1 2/2019 Arthurs et al.
10,221,010 B2 3/2019 Reeb et al.
10,618,730 B2 4/2020 Grigooris
2014/0069926 A1 3/2014 Michael et al.
(Continued)

FOREIGN PATENT DOCUMENTS

DE 4223534 2/1993
DE 29604340 6/1996
DE 19654454 12/1997
(Continued)

*Primary Examiner* — Don M Anderson
*Assistant Examiner* — Elizabeth J Volz

(57) ABSTRACT

A lock for a bin including a body and a lid hinged to the body. The lock includes a lever mounted to the lid and a plunger movable by the lever. The plunger is configured to engage a catch mounted to the body when the lid is closed and the lever is in a first position. When the lever is moved to a second position, the plunger is moved to disengage the catch and the lid is allowed to open.

19 Claims, 6 Drawing Sheets

(56) References Cited

U.S. PATENT DOCUMENTS

| | | | |
|---|---|---|---|
| 2019/0017292 | A1 | 1/2019 | Michael et al. |
| 2021/0269237 | A1 | 9/2021 | Martin et al. |

FOREIGN PATENT DOCUMENTS

| | | | | |
|---|---|---|---|---|
| DE | 19833890 | | 1/2000 | |
| DE | 19833882 | | 2/2000 | |
| DE | 29623962 | | 2/2001 | |
| DE | 20200600327 | | 6/2006 | |
| FR | 2721912 | | 1/1996 | |
| FR | 2802965 | | 6/2001 | |
| GB | 834013 | * | 5/1960 | ............. B65D 55/10 |
| GB | 2361742 | | 10/2001 | |

* cited by examiner

GRAVITY LOCK AND BIN INCLUDING THE SAME

FIELD OF THE INVENTION

The present invention relates to the general field of container locks, and is more particularly concerned with a gravity lock and with a bin including the same.

BACKGROUND

Collection bins used to collect garbage, compostable and recyclable materials generally include a bin body and a lid provided at their top. Many such bins are designed so that their lid automatically opens when the collection bin is tilted substantially upside down by a collecting truck so that any material contained therein can be collected efficiently.

However, such bins often contain organic material, such as food residues, that attract animals, such as raccoons. These animals often try to enter the bin and either disperse waste materials around the bin after climbing into the bin, or simply topple the bin, which leads to opening of the lid, and results in even more wastes dispersed on the ground. Collection bins can also be toppled due to the wind or though collision with vehicles, with the same result. Simply adding a lock to the bin is not desirable, as a simple lock will not open automatically when the bin is picked upside down by the collecting truck and would need to be manually opened before collecting the bin.

Thus, there is a need on the market for an improved device that avoids the aforementioned disadvantages. An object of the present invention is therefore to provides such an improved device.

SUMMARY OF THE INVENTION

In a broad aspect, there is provided a lockable bin, comprising: a bin body defining a cavity and a bin body opening leading thereinto, the bin body opening defining opposed opening front and rear ends, the bin body including a latch; a lid hinged to the bin body at the opening rear end and movable between open and closed positions wherein the lid respectively allows access to the cavity and extends across the opening; and a latching mechanism mounted to the lid, the latching mechanism including a plunger selectively movable between extended and retracted positions, wherein, with the lid in the closed position, in the extended position, the plunger engages the latch so that the lid is prevented from pivoting relative to the body to lock the lid in the closed position; and in the retracted position, the plunger is disengaged from the latch to allow the lid to pivot relative to the body to reach the open position. The latching mechanism further includes a lever operatively coupled to the plunger for moving the plunger between the extended and retracted positions, the lever being movable between first and second positions in which the lever is angled respectively at first and second angles relative to the lid, the second angle being larger than the first angle, the plunger moving from the extended position to the retracted position when the lever moves from the first position to the second position.

There may also be provided a lockable bin wherein the plunger is closer to the opening rear end in the retracted position than in the extended position.

There may also be provided a lockable bin wherein the plunger moves in a reciprocating movement between the extended and retracted positions, the latch defining an aperture for receiving the plunger therethrough when the lid is closed and the plunger is in the extended position.

There may also be provided a lockable bin wherein the plunger is biased away from the opening rear end.

There may also be provided a lockable bin wherein the lever pivots about a lever pivot axis, the latching mechanism further including a cam member jointly pivotable with the lever about the lever pivot axis, the cam member defining a cam surface, the cam surface being closer to the lever pivot axis at a cam first location than at a cam second location; the plunger includes an elongated pin extending from a base, the cam surface abutting against the base at the cam first location when the lever is in the first position, and the cam surface abutting against the base at the cam second location when the lever is in the second position; wherein moving the lever from the first position to the second position moves the base away from the lever pivot axis to move the plunger from the extended position to the retracted position.

The lockable bin as defined in claim 5, wherein a center of gravity of the lever is spaced apart from the lever pivot axis so that a torque is exerted about the lever pivot axis when the bin is positioned upside down.

There may also be provided a lockable bin wherein the cam surface and the base frictionally engage each other with a force sufficient for preventing the lever from pivoting from the first position to the second position unless the bin is rotated more than 90 degrees relative to an upstanding position.

There may also be provided a lockable bin wherein the latch is provided at the opening front end.

There may also be provided a lockable bin wherein the latching mechanism is configured for receiving a padlock for locking the lever in the lever first position.

There may also be provided a lockable bin wherein the latching mechanism further includes a locking member jointly movable with the lever, wherein the locking member is engaged with the plunger when the lever is in the first position and the plunger is in the extended position to prevent the plunger from moving to the retracted position, and the locking member is disengaged from plunger when the lever is in the second position to allow the plunger to move to the retracted position.

In another broad aspect, there is provided a gravity lock for a bin including a bin body defining a cavity and a bin body opening leading thereinto, the bin body opening defining opposed opening front and rear ends, the bin also including a lid hinged to the bin body at the opening rear end, the gravity lock comprising: a latch mountable to the bin body; and a latching mechanism mountable to the lid, the latching mechanism including a plunger selectively movable between extended and retracted positions; wherein, with the lid closed and the latch and latching mechanism operatively mounted to the bin in the extended position, the plunger engages the latch so that the lid is prevented from pivoting relative to the body; and in the retracted position, the plunger is disengaged from the latch to allow the lid to pivot relative to the body; The latching mechanism further includes a lever operatively coupled to the plunger for moving the plunger between the extended and retracted positions, the lever being movable between first and second positions in which, with the latching mechanism operatively mounted to the lid, the lever is angled respectively at first and second angles relative to the lid, the second angle being larger than the first angle, the plunger moving from the extended position to the retracted position when the lever moves from the first to the second position.

There may also be provided a gravity lock wherein the lever pivots about a lever pivot axis, the latching mechanism further including a cam member jointly pivotable with the lever about the lever pivot axis, the cam member defining a cam surface, the cam surface being closer to the lever pivot axis at a cam first location than at a cam second location; the plunger includes an elongated pin extending from a base, the cam surface abutting against the base at the cam first location when the lever is in the first position, and the cam surface abutting against the base at the cam second location when the lever is in the second position; wherein moving the lever from the first position to the second position moves the base away from the lever pivot axis to move the plunger from the extended position to the retracted position.

There may also be provided a gravity lock wherein the cam surface and the base frictionally engage each other with a force sufficient for preventing the lever to pivot from the first position to the second position unless the bin is rotated more than 90 degrees relative to an upstanding position.

There may also be provided a gravity lock wherein the lever is selectively detachable from the cam member, the lever and cam member being attachable to each other with different angular relationships relative to each other.

There may also be provided a gravity lock wherein the latch includes a base mountable to the bin and a latch plate pivotable relative to the base.

There may also be provided a gravity lock wherein the latching mechanism includes a housing mountable to the lid.

There may also be provided a gravity lock wherein the lever defines a compartment spaced apart from the lever pivot axis.

There may also be provided a gravity lock wherein the latching mechanism further includes a locking member jointly movable with the lever, wherein the locking member is engaged with the plunger when the lever is in the first position and the plunger is in the extended position to prevent the plunger from moving to the retracted position, and the locking member is disengaged from plunger when the lever is in the second position to allow the plunger to move to the retracted position.

There may also be provided a gravity lock wherein the plunger moves in a reciprocating movement between the extended and retracted positions, the latch defining an aperture for receiving the plunger therethrough when the lid is closed and the plunger is in the extended position.

There may also be provided a gravity lock wherein a manually removable plug is mounted inside the aperture and obstructs the aperture partially.

An advantage of the present invention resides in the fact that the container lid is unlikely to accidentally open when the collection bin is tilted on a side by a gust of wind, an animal, or by being bumped into by a vehicle while remaining relatively easy to use in refuse collection by simply tilting the proposed bin or a bin incorporating the proposed gravity lock over a truck. In some embodiments, the proposed gravity lock does not interfere with the materials contained in the bin when the latter is discharged. Also, in some embodiments, all the components of the proposed gravity lock are provided outside of the bin, which leaves the interior of the bin free to receive various materials without interference.

In some embodiments, the proposed gravity lock may be configured for compatibility with a relatively wide variety the differently shaped brands and makes of waste collection bins commonly sold on the market so as to be retrofitted thereto.

The present application hereby incorporates by reference the priority document, patent application GB2207072.6 filed May 13, 2022

Other objects, advantages and features of the present invention will become more apparent upon reading of the following non-restrictive description of some embodiments thereof, given by way of example only with reference to the accompanying drawings.

DETAILED DESCRIPTION

Figure 1:
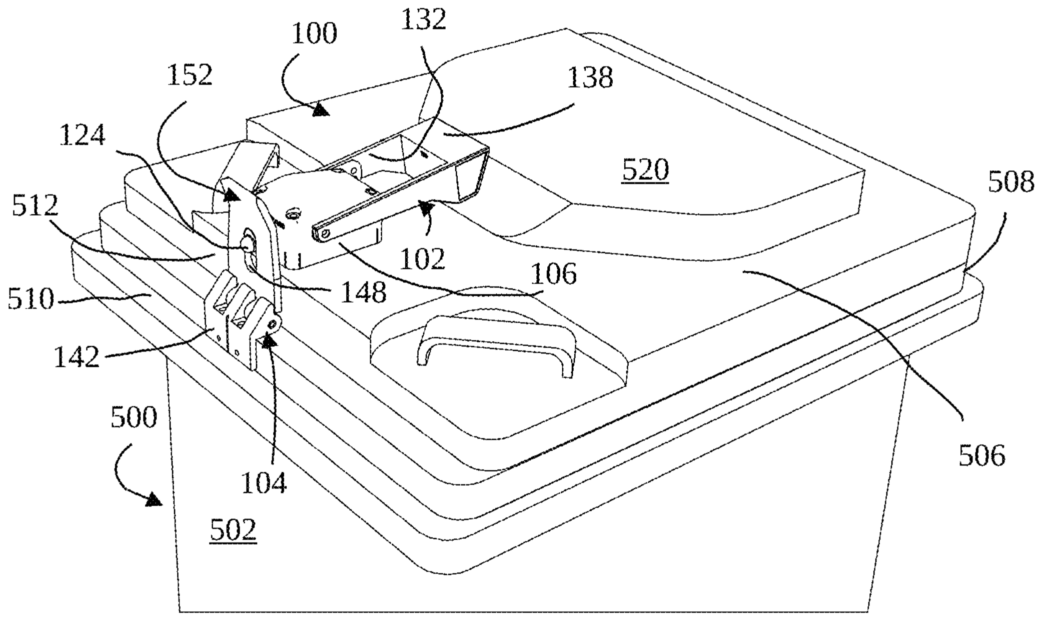
FIG. 1, in a perspective view, illustrates a lockable bin including an embodiment of a latch and an automatic latching mechanism combination, according to the present invention, here shown cooperatively mounted on a front upper edge of the container body and container lid of a waste, recycling or organic collection bin, with its container lid in a closed position and locked by the automatic latching mechanism.

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. Also, directional terminology, such as "top", is used with reference to a typical use of the proposed bin on a level ground surface with its opening facing up, such as when used to contain materials prior to collection. This terminology is used for convenience and should not be used to unduly restrict the scope of the present invention.

FIGS. 1 to 12 illustrates various aspects of an embodiment, according to the present invention, of combination 100 latch 104 and automatic latching mechanism 102 for a lockable bin 500, such as a waste, recycling or organic collection bin. The automatic latching mechanism 102 is usable for user selectively locking the container lid 506 of the lockable bin 500 in a closed position, and automatically unlocking the opening movement of the container lid 506 in an open position when the collection bin 500 is tilted substantially upside down, for example, by a waste, recycling or organic collecting truck.

In the following detailed description of the invention, similar features in the figures have been given similar reference numerals, and in order not to weigh down the figures, some elements are not referred to in some figures if they were already identified in a precedent figure.

The lockable bin 500 generally includes a bin body 502 defining a cavity 505 and a bin body opening 504 leading into the cavity 505 along an upper portion thereof, and a container lid 506 pivotably hingedly mounted at an opening rear end 508 of the bin body opening 504, thus allowing the container lid 506 to close the bin body opening 504.

Furthermore, the lockable bin 500 defines a container opening front end 510 and a container lid front edge 512 both located respectively opposite the container opening rear end 508 relative to the bin body opening 504. The lockable bin 500 further defines an imaginary longitudinal axis extending perpendicularly centrally between the container opening rear and front ends 508 and 510.

The combination 100 of the present invention includes a latching mechanism 102 mounted to the container lid 506 and adjacently the container lid front edge 512, and a catch 104 mounted to the bin body 502 and adjacently the opening front end 510. The catch 104 is located substantially proximally in front of the latching mechanism 102 when the container lid 506 is in its closed position over the bin body opening 504.

Figure 3:
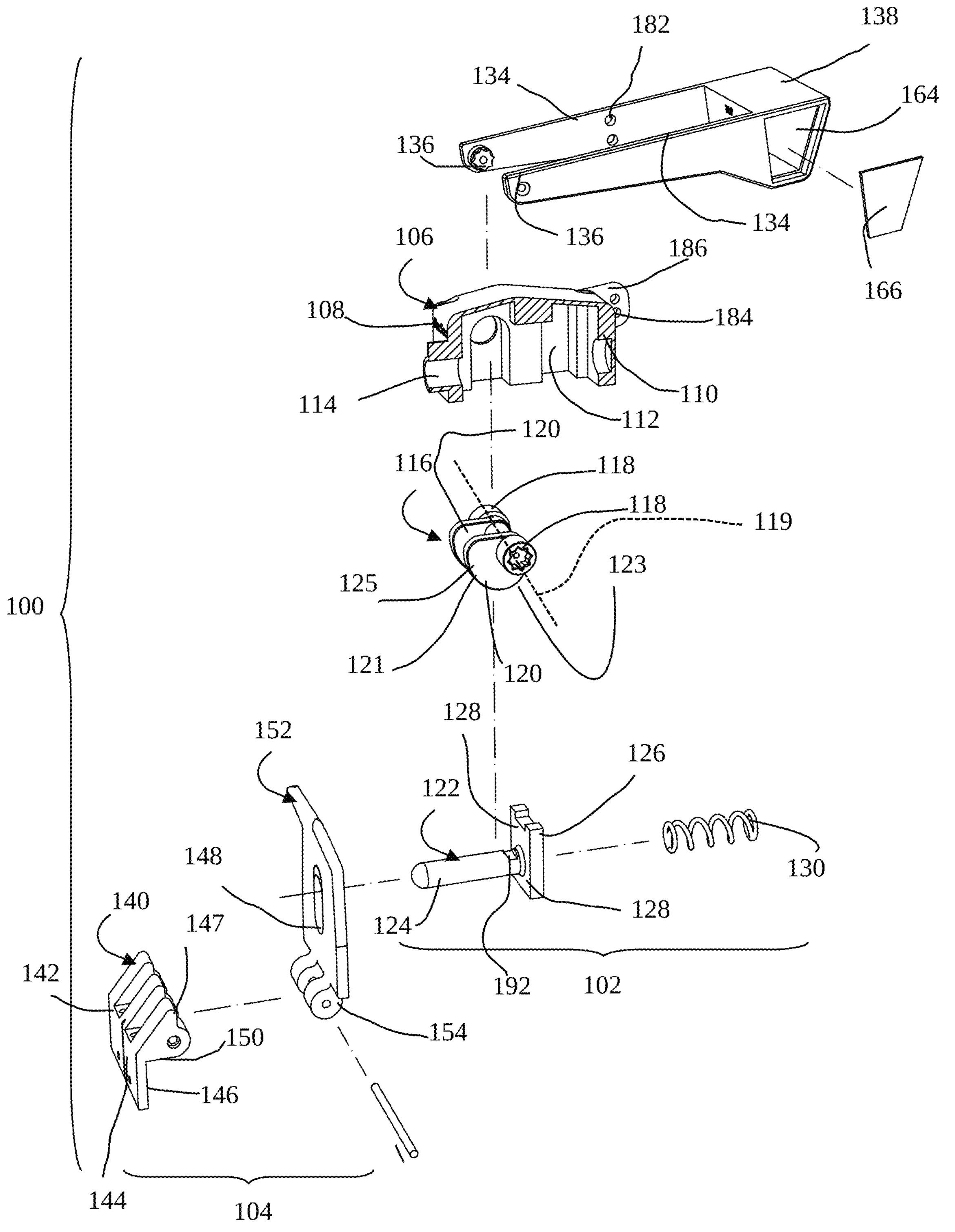
FIG. 3, in a perspective, exploded view, illustrates the latch and automatic latching mechanism of FIG. 1, here showing a support casing thereof in a cut out view.

Referring to FIG. 3, the latching mechanism 102 includes a support casing 106. The support casing 106 includes spaced apart and oppositely facing support casing front and rear walls 108 and 110, and spaced part and oppositely facing casing lateral side walls 112 extending between the support casing front and rear walls 108 and 110.

Furthermore, the support casing front wall 108 defines a casing front aperture 114. Still furthermore, the support casing 106 defines an imaginary casing longitudinal axis extending perpendicularly through the support casing front and rear walls 108 and 110.

The latching mechanism 102 further includes a pivot shaft 116. The pivot shaft 116 has a generally elongated configuration extending laterally, and generally defines a pair of longitudinally opposed pivot shaft end portions 118, and a pivot shaft intermediate portion extending therebetween. Furthermore, the pivot shaft 116 has its opposed pivot shaft end portions 118 rotably mounted throughout, respectively, the opposed support casing lateral side walls 112 so as to be pivotable about a pivot axis 119

The latching mechanism 102 further includes at least one, for example between one and four, but typically two, identically shaped cam members 120. Each cam member 120 is coaxially mounted in a laterally spaced apart relationship relative to one another along the pivot shaft 116, and defines a radially protruding rounded cam surface 121 extending radially parallelly in register relative to one another and parallelly along relative to the casing longitudinal axis. The cam surface 121 is closer to the lever pivot axis 119 at a cam first location 123 than at a cam second location 125, so that rotating the pivot shaft 116 can move a plunger 122 relative to the pivot shaft 116. In alternative embodiments, the cam members 120 may be shaped differently from each other is required by the shape of a plunger 122 described below.

Figure 4:
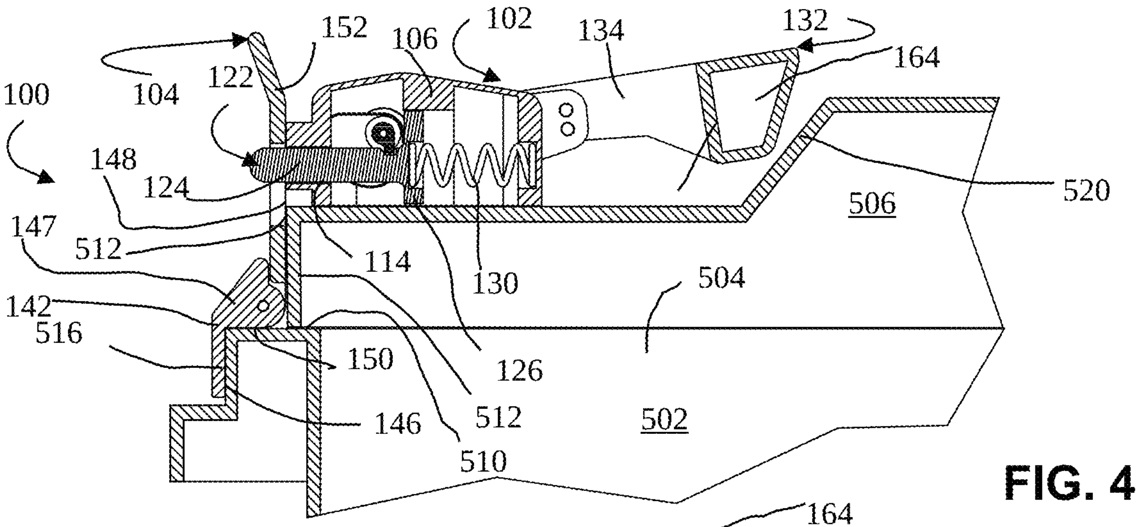
FIG. 4, in a side cutout view, illustrates the latch and automatic latching mechanism shown in FIG. 1 locked to each other.
Figure 5:
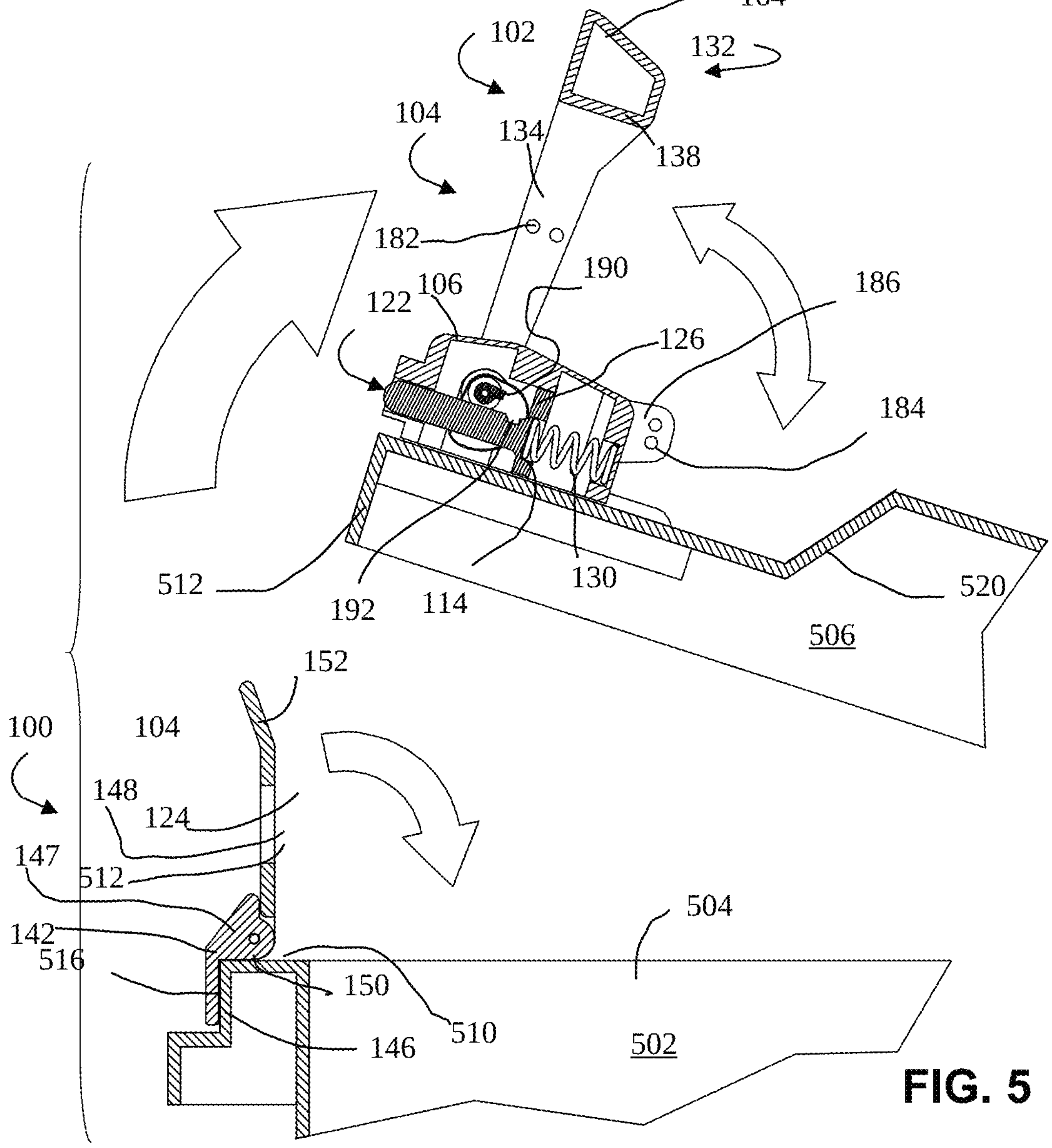
FIG. 5, in a side cutout view, illustrates the latch and automatic latching mechanism shown in FIG. 2 unlocked from each other.

The latching mechanism 102 further includes a plunger 122 selectively movable between extended and retracted positions, seen for example respectively in FIGS. 4 and 5. For example, the plunger 122 is closer to the opening rear end 508 in the retracted position than in the extended position, so as to be disengaged from the catch 104. Typically, the plunger 122 moves in a reciprocating movement between the extended and retracted positions. In the extended position, with the container lid 506 in the closed position, the plunger 122 engages the latch 104 so that the container lid 506 is prevented from pivoting relative to the container body 502 to lock the container lid 506 in the closed position. In the retracted position, the plunger 122 is disengaged from the latch 104 to allow the container lid 506 to pivot relative to the container body 502 to reach the open position. The plunger 122 has a generally elongated T-shaped configuration including an elongated plunger pin 124 extending longitudinally parallelly relative to the casing longitudinal axis, and a plunger base 126.

The plunger pin 124 typically has a substantially elongated and rectilinear configuration, and the plunger base 126 is located at a rearward end of the plunger pin 124 and includes a cam engaging portion 128 at least slightly protruding laterally on each side of the plunger pin 124.

The plunger pin 124 extends longitudinally between the pair of cam members 120 and a forward end portion thereof that is at least partially engaged through the casing front aperture 114 such that each cam engaging portions 128 of the plunger base 126 abuts along a rearward peripheral portion of a respective cam member 120. More specifically, the cam surface 121 abuts against the plunger base 126 at the cam first location 123 when the pivot shaft 116 is in a first position, and the cam surface 121 abuts against the plunger base 126 at the cam second location 125 when the pivot shaft 116 is in a second position. The pivot shaft 116 moves between the first and second positions by rotating about the pivot axis 119.

The latching mechanism 102 further includes a biasing element 130. The biasing element 130 is suitably mounted between the plunger 122 and the support casing 106 so as to biasingly urge each cam engaging portion 128 longitudinally forwardly against a respective cam member 120, such that the plunger 122 is biased away from the opening rear end 508.

The latching mechanism 102 further includes a lever 132. A center of gravity of the lever 132 is spaced apart from the pivot axis 119, so that a torque is exerted about the pivot axis 119 by the lever 132 when the bin is positioned upside down. The lever 132 is operatively coupled to the plunger 122 for moving the plunger 122 between the extended and retracted positions. In a specific example of embodiment, the lever 132 includes a pair of substantially elongated and parallelly extending lever arms 134 defining a pair of lever arm proximal ends 136 at one end thereof, and are transversally joined by a handle member 138 at a distally opposed distal end thereof. Furthermore, each lever arm proximal end 136 is connected to a respective pivot shaft distal end portion 118 such that the cam members 120 are jointly pivotable with the lever 132 about the lever pivot axis 119.

The catch 104 defines a catch aperture 148 located substantially proximally forwardly in register with the casing front aperture 114 when the container lid 506 is in a closed position on the bin body opening 504. Furthermore, the catch aperture 148 is suitably sized and configured for slidably receiving and engaging therein the plunger pin 124.

The lever 132 is pivotably movable about the pivot axis 119 between a lever first position and a lever second position in which the lever 132 is angled respectively at first and second angles relative to the container lid 506, the second angle being larger than the first angle. The plunger 122 moves from the extended position to the retracted position when the lever 132 moves from the first position to the second position.

In the lever first position, as illustrated in FIGS. 1, 4, 9 and 11, the lever 132 is typically oriented generally parallelly relative to the casing longitudinal axis, and rearwardly relative to the pivot shaft 116. At least a forward end portion of the plunger pin 124 protrudes forwardly away from the casing front wall 108. In the lever second position, as illustrated in FIGS. 2, 5, 10 and 12, the lever 132 is typically oriented generally perpendicularly relative to the casing longitudinal axis, and substantially perpendicularly upwardly relative thereof. Typically, the plunger pin 124 is then retracted inside the casing 106.

Thus, when the lockable bin 500 is in an upright position, the container lid 506 in a closed position and covering the bin body opening 504, and the lever 132 in the lever first position, the forward end portion of the plunger 122 is engaged in the catch aperture 148, thus locking the container lid 506 in the closed position relative to the bin body opening 504. Furthermore, when a user desires to add waste, recycling or organic material into the bin body 502, he or she moves the lever 132 by hand to the lever second position, then lifts the container lid 506 to access the interior of the bin body 502, followed with re-closing the container lid 506 and, finally, lowering down the lever 132 to the lever second position, so as to lock the container lid 506 in the closed position.

Furthermore, when the lockable bin 500 is in the upright position, with the lever 132 in lever first position as described further above, animals such as raccoons, skunks, bears, and the likes, are prevented from opening the container lid 506 for accessing the content of the bin body 502. Yet furthermore, when the lockable bin 500 is in the upright position, with the lever 132 in the lever first position as described further above, then is accidentally toppled on a side by a wind gust, a moving vehicle, or an animal desiring to access its content, the lever 132 remains substantially in the lever first position such that the container lid 506 also remains in the closed position relative to the bin body opening 504.

Still furthermore, when the lockable bin 500 is in the upright position, with the lever 132 in the lever first position, as described further above, and is then titled to a substantially upside down position over a waste, recycling or organic collecting truck, for emptying the lockable bin's 500 content in the truck cargo bay, the momentum of the typically energetic tilting movement urges the lever 132 to pivotably move by gravity in a pendulum movement towards the lever second position. Consequently, the plunger pin 124 retracts out of the catch aperture 148 and, thus, frees the pivotal movement of the container lid 506 to a substantially wide open position relative to the bin body opening 504, hence allowing the content of the collection bin 500 to fall by gravity into the cargo bay of the collecting truck.

It is important to note that the spring urged mechanical pressure of the plunger base 126 on the periphery of the cam members 120 effects at least a slight mechanical friction pressure therebetween and, thus, effects a resistance to the rotational movement by gravity of the lever 132 about the axis of the pivot shaft 116. In some embodiments, the cam surface 121 and the base 126 frictionally engage each other with a force sufficient for preventing the lever 132 to pivot from the lever first position to the lever second position unless the bin 500 is rotated more than 90 degrees relative to an upstanding position. In some embodiments, this friction is large enough that to provoke a pendulum movement by gravity of the lever 132 from the lever first position to the lever second position requires a substantially energetic forward tilting of the lockable bin 500 to a substantially upside down position. Thus, a simple tilting on a side, including the front side, of the lockable bin 500, is typically unlikely to fully overcome the mechanical friction described above in order to provoke a sufficient pendulum movement of the lever 132 towards the lever second position. The number of cam members 120 parallelly mounted on the pivot shaft 116 and the spring constant of the biasing element 130 may be used to modulate a desired level of rotational resistance thereof.

Figure 6:
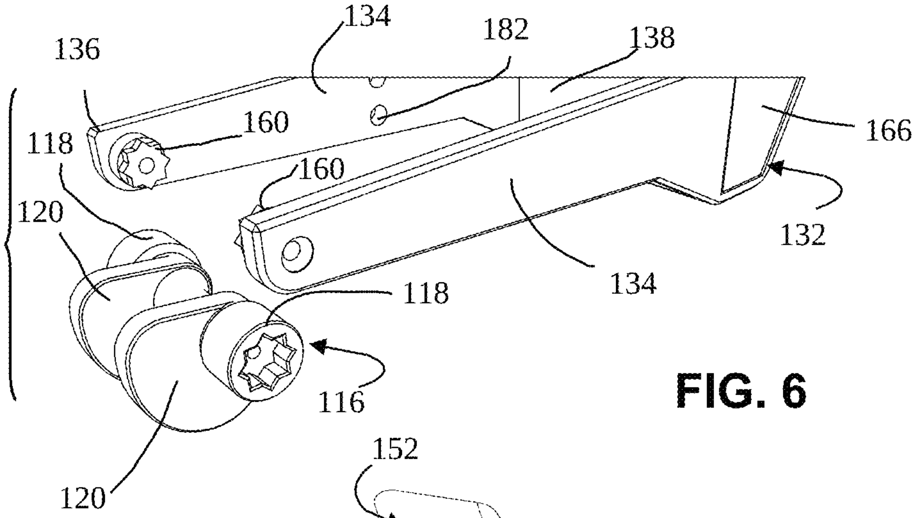
FIG. 6, in a partial perspective, exploded view, illustrates a lever removably and adjustably attachable to a pivot shaft, both part of the latching mechanism of FIG. 1.

Referring to FIGS. 3, 4 and 6, in some embodiments of the invention, the catch 104 includes a base member 140. The base member 140 includes a base member lower portion 142. The base member lower portion 142 has a generally elongated plate-like configuration extending substantially laterally and vertically relative to the container longitudinal axis.

Furthermore, the base member 140 defines a base member first planar surface 144 facing substantially forwardly, and a base member second planar surface 146 facing substantially oppositely rearwardly respectively, relative to the container longitudinal axis, and a base member upper portion 147.

The base member upper portion 147 extends at least partially rearwardly relative to the base member lower portion 142, and defines a substantially planar base member underside surface 150 facing substantially downwardly, so as to form a right angle in cross-section relative to the adjacent base member second planar surface 146.

Figure 7:
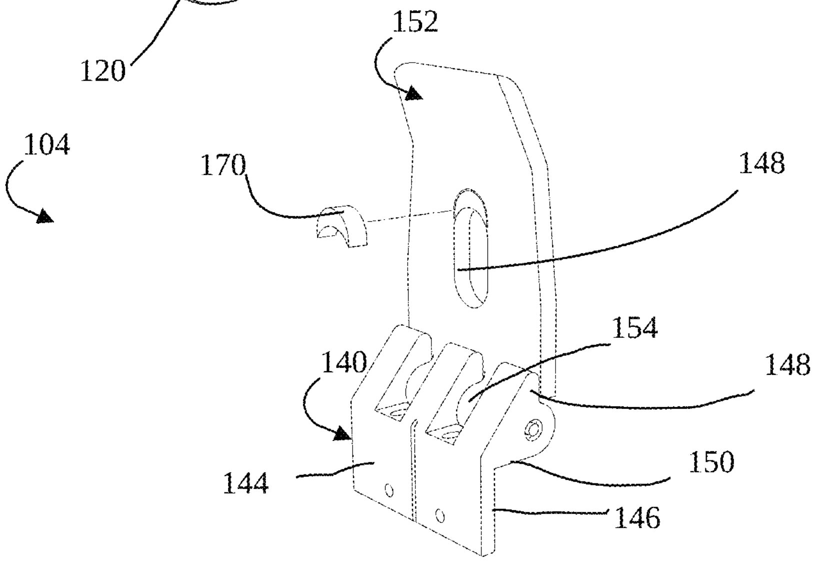
FIG. 7, in a partial perspective, exploded view, illustrates the catch of FIG. 1 provided with a tearable portion for expanding a catch plate aperture defined therein.

Referring to FIGS. 3 and 7, the catch 104 further includes a catch plate 152. The catch plate 152 has a generally elongated plate-like configuration extending parallelly relative to the bin body 502, and includes a catch plate lower portion 154 pivotably mounted to the base member upper portion 147 along a catch assembly pivot axis extending laterally parallelly relative to the bin body 502. The catch aperture 148 extends through the plate-like configuration of the catch plate 152.

Furthermore, in some embodiments, the catch plate 152 is pivotable relative to the base member 140 between a catch plate first position, wherein the catch plate 152 is oriented substantially upwardly, and a catch plate second position, wherein the catch plate 152 is oriented towards at least one of a substantially forward orientation, and a substantially rearward orientation respectively, relative to the container longitudinal axis. Thus, the catch 104 may have its base member 140 mounted in one of a first mounting location, as illustrated in FIGS. 1, 2, 4 and 5, and a second mounting location, as illustrated in FIGS. 9 to 12 inclusively.

Referring now more particularly to FIGS. 4 and 5, in the first mounting location, the base member 140 has its base member second planar surface 146 and planar base member underside surface 150 connected on an upper forward angular edge portion 516 of the bin body 502, wherein the catch plate 152 may extend substantially upwardly therefrom when in the catch plate first position.

Figure 11:
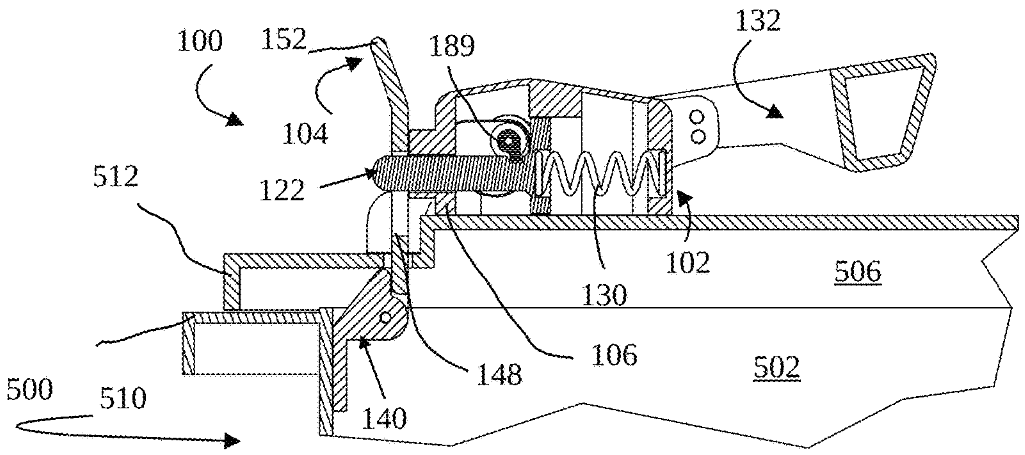
FIG. 11, in a side cutout view, illustrates the latch and automatic latching mechanism in the configuration shown in FIG. 9 locked to each other.
Figure 12:
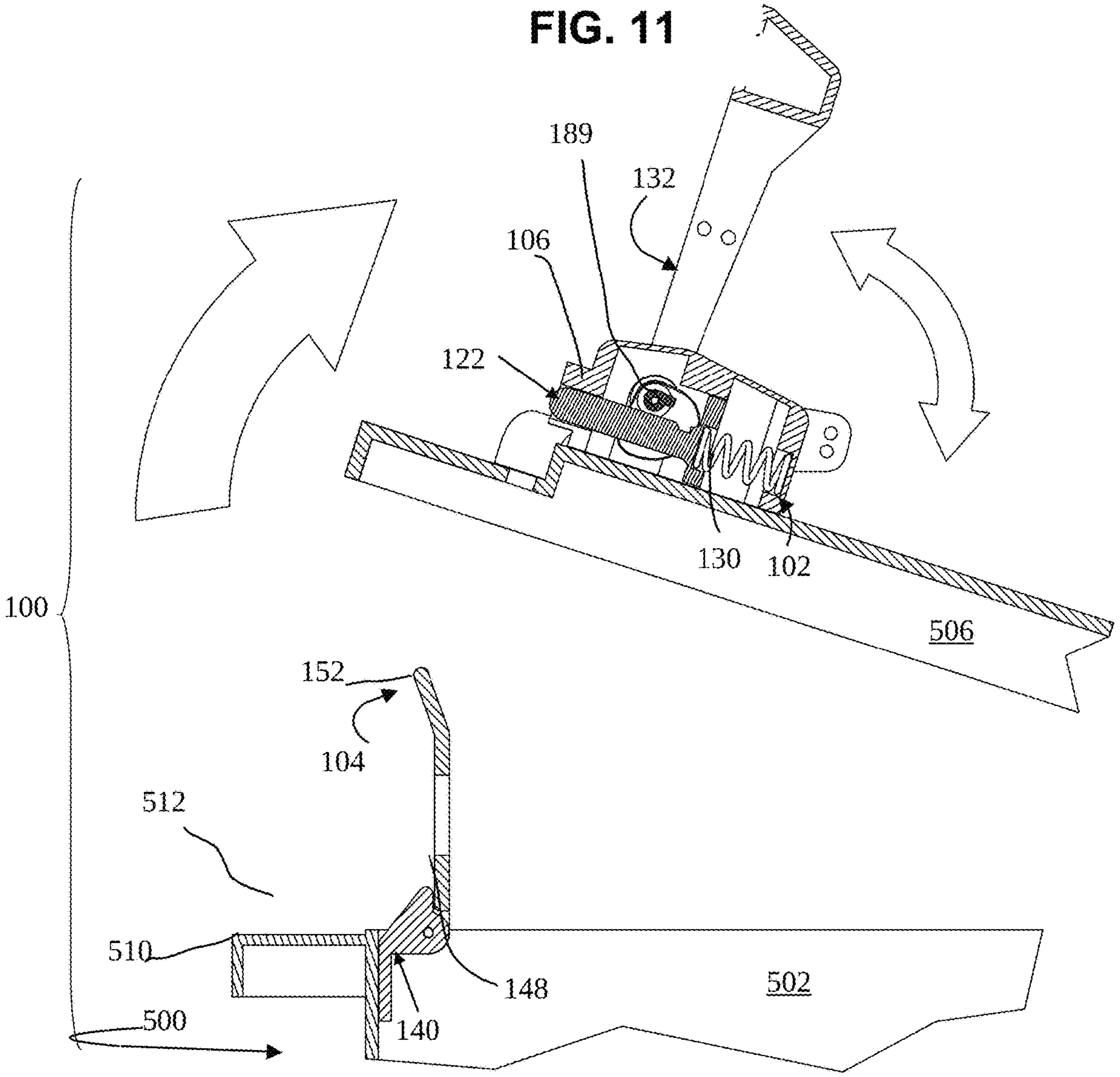
FIG. 12, in a side cutout view, illustrates the latch and automatic latching mechanism in the configuration shown in FIG. 10.

Referring now more particularly to FIGS. 11 and 12, in the second mounting location, the base member 140 has its base member first planar surface 144 coplanarly connected along a vertically extending inner surface portion of the interior of the bin body 502, and substantially adjacently the bin body opening 504 thereof, wherein the catch plate 152 may extend substantially upwardly therefrom when in the catch plate first position, and through a user defined catch aperture 148 extending in register through the container lid 506.

Thus, advantageously, the automatic combination 100 of the present invention may be mounted on a significantly larger variety of differently shaped container lids 506 and upper front edge portions of bin body opening 504, compared to known gravity latching mechanism's for lockable bins 500 of the prior art.

In some embodiments, with the catch 104 mounted in the first mounting location (e.g. centrally along the exterior of the upper forward edge of the bin body opening 504, as illustrated in FIGS. 1, 2, 4 and 5), the limited forward and rearward pivotal movement of the catch plate 152 imposed by the base member 140 and the top horizontal surface of the container opening front end 510, as best illustrated in FIG. 5, help prevent the pivotable catch plate 152 to be damaged or broken away when the lockable bin 500 is energetically tilted upside down over the collecting truck.

Furthermore advantageously, with the catch 104 mounted in the second mounting location (e.g. centrally along the interior of the upper forward edge of the bin body opening 504, as illustrated in FIGS. 9 to 12), the catch plate 152 may further pivot rearwardly and downwardly inside the bin body 502, to facilitate further the addition of waste, recycling or organic material into the collection bin 500.

In some embodiments of the invention, the latching mechanism 102 further includes a compressible resilient material covering at least one surface in a pair of mutually contacting surfaces between the plunger base 126 and the cam members 120. Thus, the mechanical friction there between at least slightly raises the rotational resistance of the pivot shaft 116 relative to the gravity induced pendulum movement exerted on the lever 132. For example (not shown in the figures), each contacting surfaces of the plunger base 126 with the cam members 120 may be covered with a suitable layer of synthetic rubber, foam, or other similar resilient materials.

Thus, advantageously, if the lockable bin 500 accidentally falls sidewardly and rolls two or three times on the sides down a sloping street, the lever 132 may be substantially prevented from pivoting towards the lever second position and let the container lid 506 free to open since the lockable bin 500 is not sufficiently tilted upside down.

In some embodiments of the invention, the biasing element 130 is a coil spring operatively mounted between the support casing rear wall 110 and a rearward surface portion of the plunger base 126. Other known types and configurations for the biasing element 130 are also possible for equivalently biasingly urging the plunger base 126 longitudinally forwardly against the pair of cam members 120.

Referring to FIG. 6, in some embodiments of the invention, the lever 132 is user removably and selectably angularly connectable relative to the pivot shaft 116, for example through compatibly shaped polygonal protrusions 160 and bores 162 arrangements between the lever arm proximal ends 136 and the pivot shaft end portions 118 respectively. Other known equivalent arrangements between the lever arm proximal ends 136 and the pivot shaft distal end portions 118 for user removably and selectably angularly connecting the lever 132 to the pivot shaft 116 are also possible. Thus, in such embodiments, the lever 132 is selectively movable relative to the cam member 120 so that an angle between the cam member 120 and the lever 132 is adjustable.

Indeed, as exemplified in FIGS. 1, 2, 4, and 5, selected models of container lids 506 defines a prominent bulge 520 protruding upwardly along a substantially rear half portion of the top surface thereof. Thus, by selectively adjusting the angle of the lever 132 relative to the pivot shaft 116, when the lever 132 is in the lever first position, the user is able to render unhindered the full pivoting movement of the lever 132 relative to the support casing 106 mounted on the container lid 506.

Thus, advantageously along with the catch 104 being relatively easily mounted outside or inside the edge of the bin body opening 504, the user selectable angle at which the lever 132 can be removably connected to the pivot shaft end portions 118 allows the automatic latching mechanism 102 of the present invention to be readily mountable on a relatively more wide variety of models of commercially available lockable bin 500 compared to known gravity operated automatic latching mechanism 102 of the prior art.

Referring for example to FIG. 3, in some embodiments of the invention, the handle member 138 defines a compartment 164 closable with a cap 166 for user selectably inserting therein weight material (not shown in the figures) so as to add weight at the distal end of the lever 132. Thus, the added weight in the handle member 138 raises the pivoting pendulum power urged by the lever 132 on the pivoting action of the cam members 120 on the plunger 122 when the lockable bin 500 is tilted upside down over a waste collecting vehicle.

A raised pivoting pendulum power of the lever 132 may be advantageously used when heavy waste or recyclable material is often poured into the lockable bin 500, such as rocks, construction bricks, broken pieces of concrete, and the likes, already abut strongly against the inner surface of the container lid 506 before the lockable bin 500 is sufficiently tilted upside down to initiate the pivoting movement of the lever 132. Thus, a jammed rearward sliding movement of the plunger 122 out of the catch aperture 148 due to the strong mechanical pressure there between may be avoided with the added weight in the handle member 138.

Referring to FIG. 7, in some embodiments of the invention, a manually removable plug 170 is mounted inside the catch aperture 148 and obstructs the latter partially. For example, the catch plate 152 includes a tearable portion, forming the removable plug 170, along at least the upper portion of the catch aperture 148, so as to user selectably expand the catch aperture 148.

As exemplified in FIG. 7, the profile of the tearable portion may be defined in the catch plate 152 by a series of suitably sized and shaped perforations allowing a user to tear away the tearable portion 170, for example, with a pair of pliers or another equivalent hand tool.

The user may selectively remove the tearable portion 170 when, for example, he or she installed the catch 104 just slightly too low relative to the plunger 122, to a point where there is a risk of a too great friction force there between when the lever 132 is in the hand lever first position and hinders the pivotal movement of the latter towards the hand lever second position.

Thus, advantageously along with the alternate mounting positions of the catch 104, and the user selectable angle of the lever 132, the automatic combination 100 of the present invention may be relatively easily adjustably mounted on a commercially available container bin 500.

In some embodiments, as illustrated in the figures, the pivotable junction between the base member 140 and the pivotable catch plate 152 of the catch 104 is suitably shape configured such that the pivotable movement of the catch plate 152 relative to the base member 140 is limited between the catch plate first position, wherein the catch plate 152 is oriented substantially upwardly, and the catch plate second position, wherein the catch plate 152 is oriented substantially rearwardly relative to the container longitudinal axis.

Referring for example collectively to FIGS. 3, 4, 5 and 8, in some embodiments of the invention, the automatic latching mechanism 102 is configured for receiving a padlock 530 for locking the lever 132 in the lever first position. For example, the latching mechanism 102 further comprises a locking aperture arrangement 180 usable with the padlock 530. The aperture arrangement 180 includes one or more lever arm padlock engaging apertures 182 (as best illustrated in FIG. 6) defined laterally through at least one of the lever arms 134, and one or more support casing padlock engaging apertures 184 extending laterally through a thumb like protrusion 186 along the outer surface of the support casing 106. Furthermore, at least one of the lever arm padlock engaging apertures 182 and at least one of the support casing padlock engaging apertures 184 are in register relative to one another when the lever 132 is in the lever first, or locked, position, for allowing a user to selectively engage there through a padlock 530 for user selectively locking the container lid 506 with the bin body 502. Other known configurations and arrangements for locking the lever 132 in the lever first position relative to the support casing 106 are also possible.

Referring more for example collectively to FIGS. 4 and 5, in some embodiments of the invention, the automatic latching mechanism 102 further comprises an automatic lock mechanism. The automatic lock mechanism includes a locking member 189 jointly movable with the lever 132 and defining a locking protrusion 190 extending radially distally away from the pivot shaft 116, and a compatibly shaped and sized locking notch 192 extending radially inwardly along a longitudinal side surface portion of the plunger pin 124. The locking notch 192 is suitably located along the plunger pin 124 so as to be in register with the locking protrusion 190 as the pivot shaft 116 when the lever 132 pivots between the hand lever second position to the hand lever first position, as illustrated in FIGS. 5 and 4, respectively. Thus, when the lever 132 is in the first position, the locking protrusion 190 is engaged in the locking notch 192 such that the plunger 122 is locked relative to the support casing 106.

Figure 8:
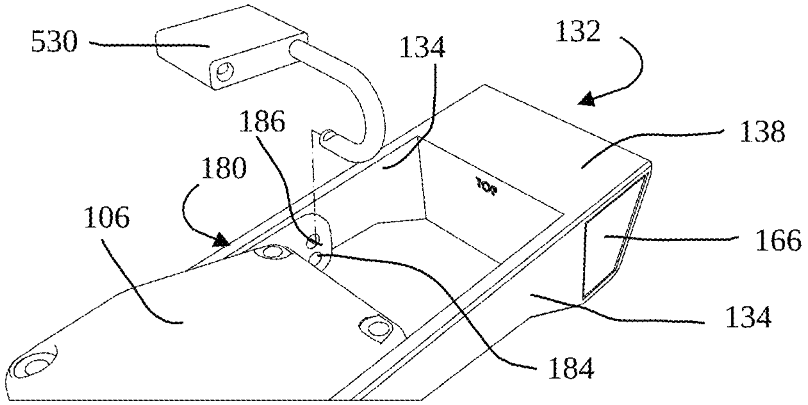
FIG. 8, in a perspective view, illustrates a locking aperture arrangement usable with a padlock for locking the pivotal movement of the lever relative to the support casing of the automatic latching mechanism.
Figure 9:
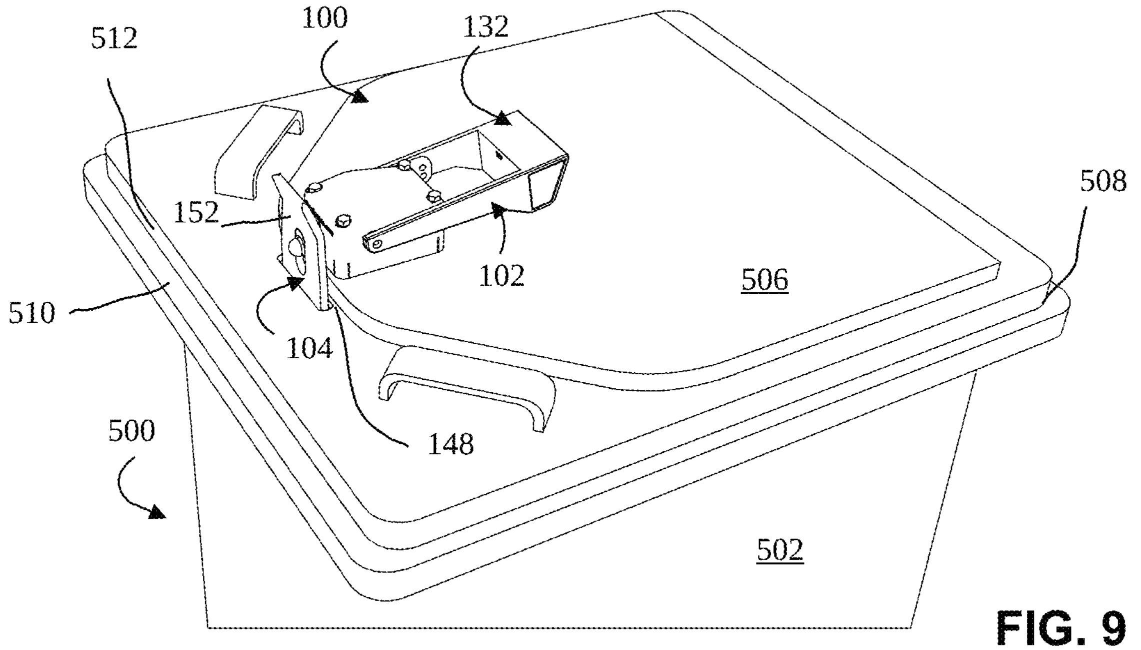
FIG. 9, in a perspective view, illustrates the latch and automatic latching mechanism, here shown mounted on a closed collection bin, as shown in FIG. 1, with the difference that its catch is connected along a front inner surface of the container opening, with a catch plate thereof extending upwardly through an aperture defined in the container lid.

Thus, the locking member 189 is engaged with the plunger 122 when the lever 132 is in the lever first position and the plunger 122 is in the extended position to prevent the plunger 122 from moving to the retracted position, and the locking member 189 is disengaged from the plunger 122 when the lever 132 is in the second position to allow the plunger 122 to move to the retracted position. Hence, the automatic lock mechanism, in cooperation with the use of a padlock 530 engaged in the locking aperture arrangement 180 as illustrated in FIG. 8, prevents an intended person with an elongated stem-like tool to push longitudinally inwardly on the forward tip end of the plunger 122 relative to the support casing 106, so as to bypass the presence of a padlock 530 engaged in the locking aperture arrangement 180. Thus, the intended person is prevented from gaining unauthorized access to the content of the lockable bin 500.

Figure 2:
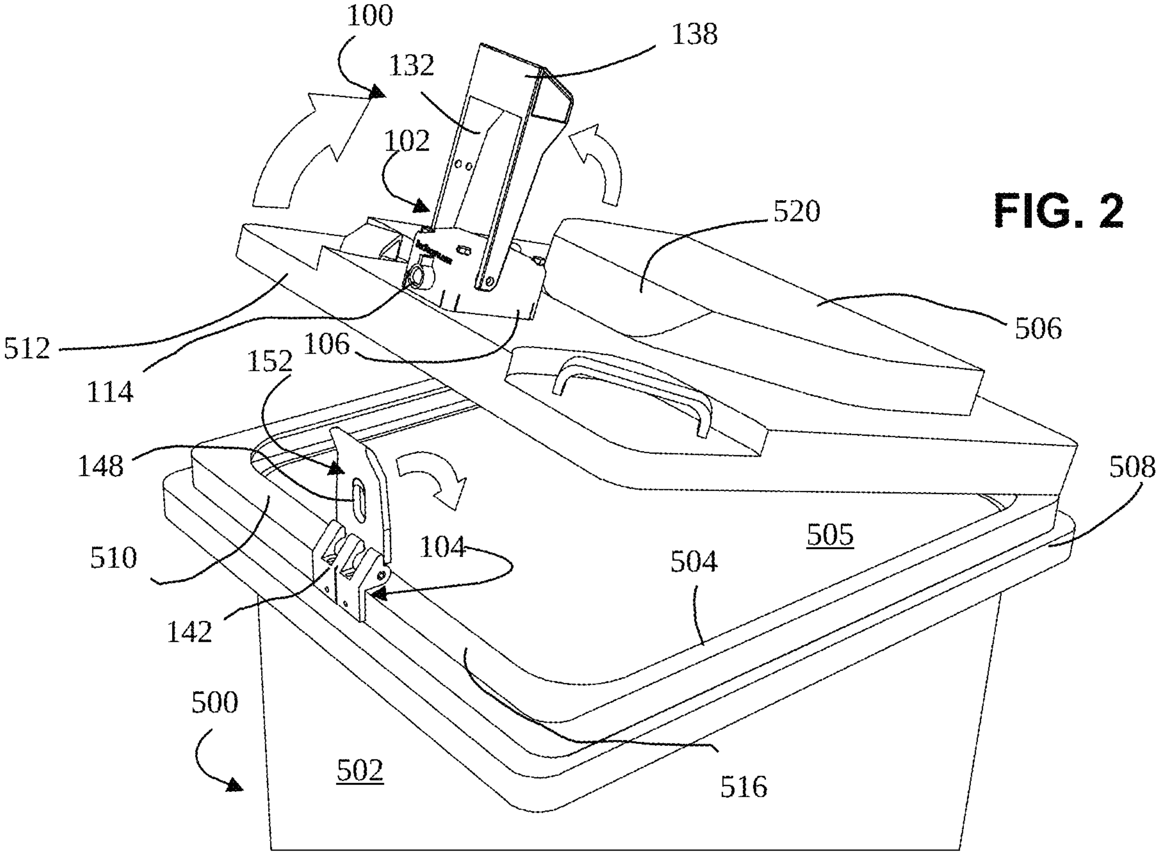
FIG. 2, in a perspective view, illustrates the latch and automatic latching mechanism in FIG. 1, here shown mounted on the lockable bin, in an unlocked position, and with the container lid in an open position.
Figure 10:
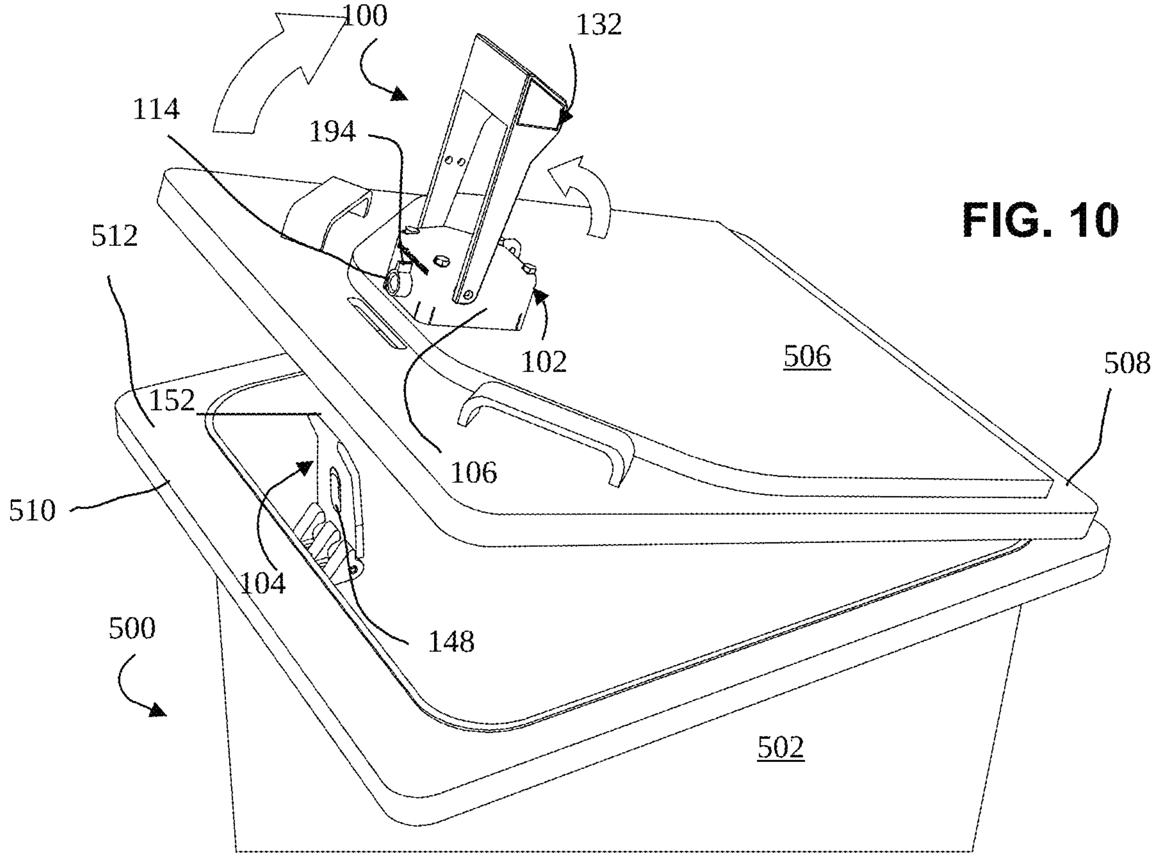
FIG. 10, in a perspective view, illustrates the automatic latching mechanism in FIG. 9, here shown unlocked and with the container lid in an open position.

Referring more particularly to FIGS. 2 and 10, in some embodiments of the invention, the automatic latching mechanism 102 further comprises alignment indicia to facilitate the installation of the support casing 106 centrally forwardly along the top surface of the container lid 506 with suitable bolt and nuts combinations.

For example, the alignment indicia is represented by an alignment protrusion 194 extending longitudinally forwardly along a centered front end top surface portion of the support casing 106. As exemplified in the figures, the alignment protrusion 194 thus extends on top of a forwardly extending tubular portion of the support casing 106 in which is slidably engaged the plunger 122.

The various elements included in the combination 100 of the present invention may be made of any suitably rigid material such as, but not limited to, a rigid polymeric material, or plastic, aluminum, stainless steel, or a combination thereof.

Depending on the size of the lockable bin 500, such as a relatively large and robust industrial lockable bin, the combination 100 of the present invention may be suitably sized and shaped, as well as having more than one unit mounted in a spaced apart relationship along the front edge of a container lid 506 thereof.

It is also contemplated that the base member 140 of the catch 104, and the support casing 106 of the latching mechanism 102, may be integrally formed in the bin body 502 and container lid 506 respectively, of the lockable bin 500.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A lockable bin, comprising:

a bin body defining a cavity and a bin body opening leading thereinto, the bin body opening defining opposed opening front and rear ends, the bin body including a latch;

a lid hinged to the bin body at the opening rear end and movable between open and closed positions wherein the lid respectively allows access to the cavity and extends across the opening; and a latching mechanism mounted to the lid, the latching mechanism including a plunger selectively movable between extended and retracted positions, wherein, with the lid in the closed position, in the extended position, the plunger engages the latch so that the lid is prevented from pivoting relative to the body to lock the lid in the closed position; and in the retracted position, the plunger is disengaged from the latch to allow the lid to pivot relative to the body to reach the open position;

the latching mechanism further including a lever operatively coupled to the plunger for moving the plunger between the extended and retracted positions, the lever being movable between first and second positions in which the lever is angled respectively at first and second angles relative to the lid, the second angle being larger than the first angle, the plunger moving from the extended position to the retracted position when the lever moves from the first position to the second position;

wherein the lever pivots about a lever pivot axis, a center of gravity of the lever being spaced apart from the lever pivot axis so that a torque is exerted about the lever pivot axis when the bin is positioned upside down.

2. The lockable bin as defined in claim 1, wherein the plunger is closer to the opening rear end in the retracted position than in the extended position.

3. The lockable bin as defined in claim 2, wherein the plunger moves in a reciprocating movement between the extended and retracted positions, the latch defining an aperture for receiving the plunger therethrough when the lid is closed and the plunger is in the extended position.

4. The lockable bin as defined in claim 3, wherein the plunger is biased away from the opening rear end.

5. The lockable bin as defined in claim 1, wherein the latching mechanism further includes a cam member jointly pivotable with the lever about the lever pivot axis, the cam member defining a cam surface, the cam surface being closer to the lever pivot axis at a cam first location than at a cam second location;

the plunger includes an elongated pin extending from a base, the cam surface abutting against the base at the cam first location when the lever is in the first position, and the cam surface abutting against the base at the cam second location when the lever is in the second position;

wherein moving the lever from the first position to the second position moves the base away from the lever pivot axis to move the plunger from the extended position to the retracted position.

6. The lockable bin as defined in claim 5, wherein the cam surface and the base frictionally engage each other with a force sufficient for preventing the lever from pivoting from the first position to the second position unless the bin is rotated more than 90 degrees relative to an upstanding position.

7. The lockable bin as defined in claim 1, wherein the latch is provided at the opening front end.

8. The lockable bin as defined in claim 1, wherein the latching mechanism is configured for receiving a padlock for locking the lever in the lever first position.

9. The lockable bin as defined in claim 8, wherein the latching mechanism further includes a locking member jointly movable with the lever, wherein the locking member is engaged with the plunger when the lever is in the first position and the plunger is in the extended position to prevent the plunger from moving to the retracted position, and the locking member is disengaged from plunger when the lever is in the second position to allow the plunger to move to the retracted position.

10. A gravity lock for a bin including a bin body defining a cavity and a bin body opening leading thereinto, the bin body opening defining opposed opening front and rear ends, the bin also including a lid hinged to the bin body at the opening rear end, the gravity lock comprising:

a latch mountable to the bin body; and a latching mechanism mountable to the lid, the latching mechanism including a plunger selectively movable between extended and retracted positions;

wherein, with the lid closed and the latch and latching mechanism operatively mounted to the bin in the extended position, the plunger engages the latch so that the lid is prevented from pivoting relative to the body;

in the retracted position, the plunger is disengaged from the latch to allow the lid to pivot relative to the body;

the latching mechanism further including a lever operatively coupled to the plunger for moving the plunger between the extended and retracted positions, the lever being movable between first and second positions in which, with the latching mechanism operatively mounted to the lid, the lever is angled respectively at first and second angles relative to the lid, the second angle being larger than the first angle, the plunger moving from the extended position to the retracted position when the lever moves from the first to the second position;

wherein the lever pivots about a lever pivot axis, a center of gravity of the lever being spaced apart from the lever pivot axis so that a torque is exerted about the lever pivot axis when the bin is positioned upside down with the gravity lock operatively mounted thereto.

11. The gravity lock as defined in claim 10, wherein the latching mechanism further includes a cam member jointly pivotable with the lever about the lever pivot axis, the cam member defining a cam surface, the cam surface being closer to the lever pivot axis at a cam first location than at a cam second location;

the plunger includes an elongated pin extending from a base, the cam surface abutting against the base at the cam first location when the lever is in the first position, and the cam surface abutting against the base at the cam second location when the lever is in the second position;

wherein moving the lever from the first position to the second position moves the base away from the lever pivot axis to move the plunger from the extended position to the retracted position.

12. The gravity lock as defined in claim 11, wherein the cam surface and the base frictionally engage each other with a force sufficient for preventing the lever to pivot from the first position to the second position unless the bin is rotated more than 90 degrees relative to an upstanding position.

13. The gravity lock as defined in claim 11, wherein the lever is selectively detachable from the cam member, the lever and cam member being attachable to each other with different angular relationships relative to each other.

14. The gravity lock as defined in claim 10, wherein the latch includes a base mountable to the bin and a latch plate pivotable relative to the base.

15. The gravity lock as defined in claim 10, wherein the latching mechanism includes a housing mountable to the lid.

16. The gravity lock as defined in claim 10, wherein the lever defines a compartment spaced apart from the lever pivot axis.

17. The gravity lock as defined in claim 10, wherein the latching mechanism further includes a locking member jointly movable with the lever, wherein the locking member is engaged with the plunger when the lever is in the first position and the plunger is in the extended position to prevent the plunger from moving to the retracted position, and the locking member is disengaged from plunger when the lever is in the second position to allow the plunger to move to the retracted position.

18. The gravity lock as defined in claim 10, wherein the plunger moves in a reciprocating movement between the extended and retracted positions, the latch defining an aperture for receiving the plunger therethrough when the lid is closed and the plunger is in the extended position.

19. The gravity lock as defined in claim 18, wherein a manually removable plug is mounted inside the aperture and obstructs the aperture partially.

* * * * *